March 14, 1939.  F. O. TAYLOR  2,150,298
SEED CLEANER AND GRADER
Filed Dec. 17, 1936  3 Sheets-Sheet 1
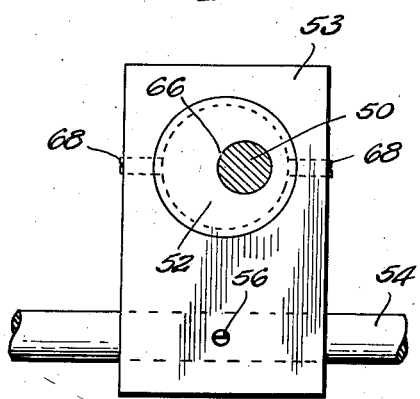
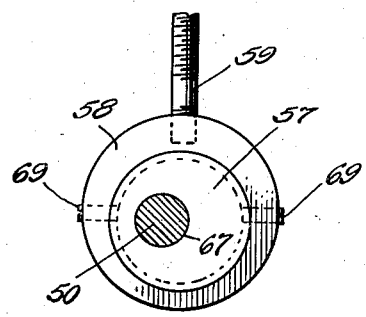
Inventor
F. O. Taylor.
By Lacey & Lacey,
Attorneys

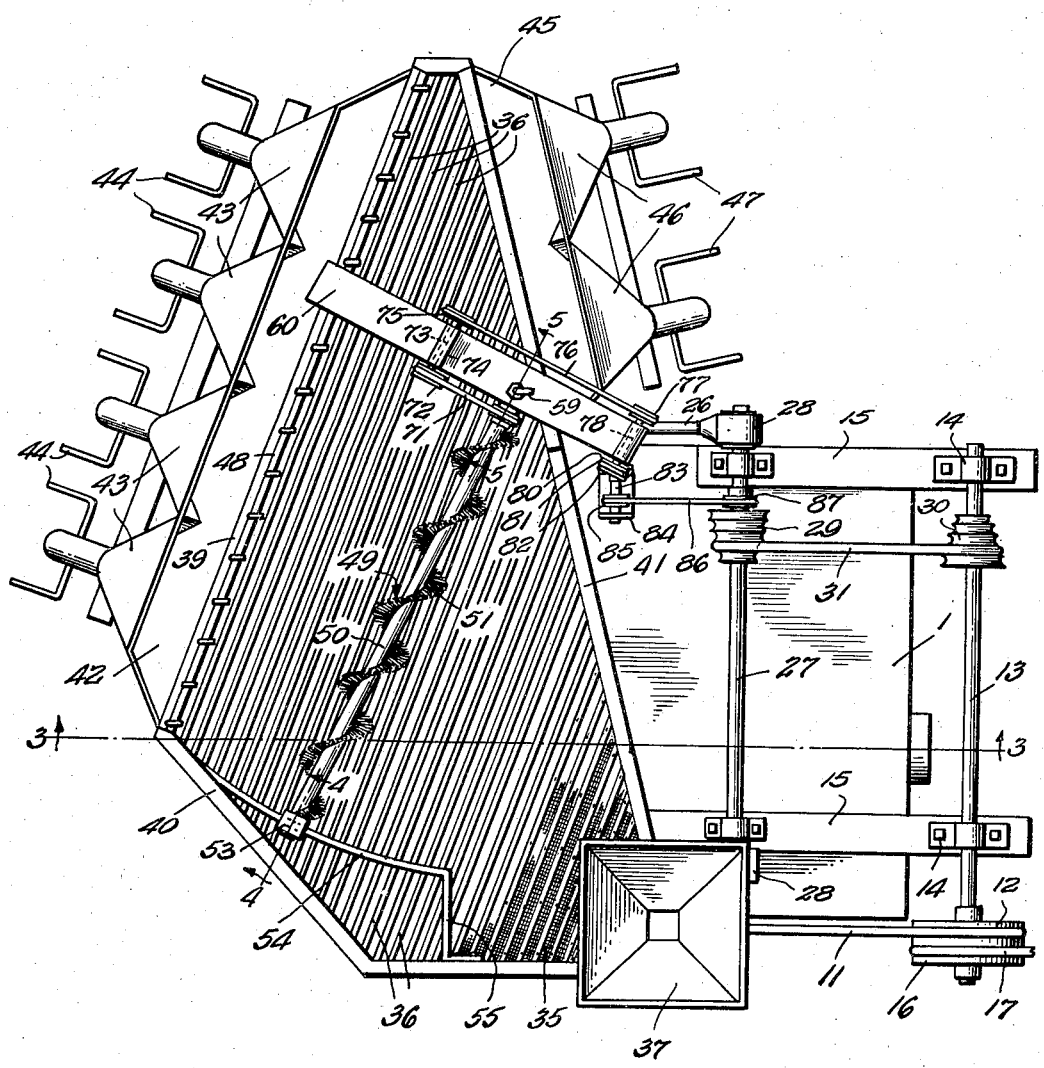

March 14, 1939.                  F. O. TAYLOR                    2,150,298
                            SEED CLEANER AND GRADER
                          Filed Dec. 17, 1936          3 Sheets-Sheet 3

Inventor
F. O. Taylor.
By Lacey & Lacey,
Attorneys

Patented Mar. 14, 1939

2,150,298

UNITED STATES PATENT OFFICE 2,150,298

SEED CLEANER AND GRADER

Frank O. Taylor, Hot Springs, Mont., assignor to The Taylor Seed Cleaner & Grader Company, Hot Springs, Mont., a corporation of Montana Application December 17, 1936, Serial No. 116,427

3 Claims. (Cl. 209—467)

This invention relates to a seed cleaner and grader and constitutes an improvement in the type of seed cleaner and grader disclosed in my prior Patent No. 1,833,447, issued November 24, 1931.

The improvement particularly relates to the construction of the grain deck across which the grain travels from the outlet spout of the hopper to the distributing platform, and one object of the invention is to so form the grain deck that the grain will be thoroughly agitated as it moves across the deck and light seed separated from heavy seed while dust, chaff and the like will be blown upwardly from the seed by air passing upwardly through the deck.

Another object of the invention is to provide the deck with a plurality of bars or strips which extend longitudinally thereof and are of such outline in cross section that as a mass of grain is moved along the deck by vibration imparted to the deck the light and heavy seed will be very effectively separated from each other.

Another object of the invention is the provision of an improved brush operating over the bars of the deck and serving to agitate the mass of seed moving across the deck and thus eliminate likelihood of the light and heavy seed not being properly separated from each other.

Another object of the invention is to so mount the brush that it may be adjusted transversely of the seed-engaging bars or strips carried by the deck and thus dispose it in the position in which it will operate most effectively upon the grain.

Another object of the invention is to provide improved means for transmitting rotary motion from a shaft of the apparatus to the brush.

The invention is illustrated in the accompanying drawings, wherein—

Figure 1 is a perspective view of the improved seed cleaner and grader,

Figure 2 is a top plan view thereof,

Figure 3:
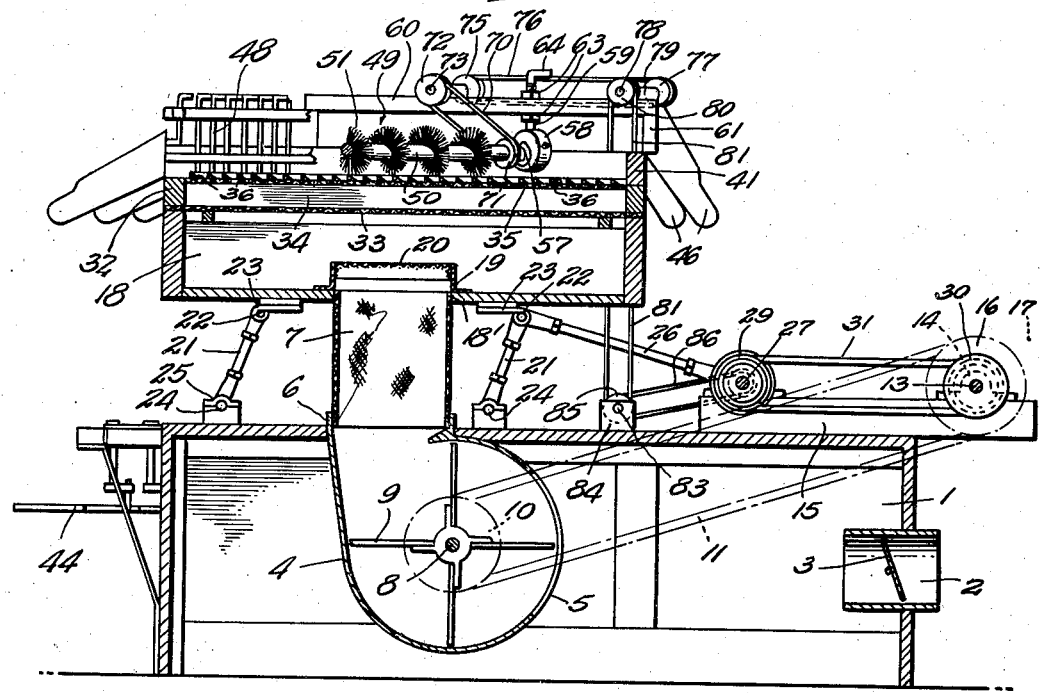
Figure 4:
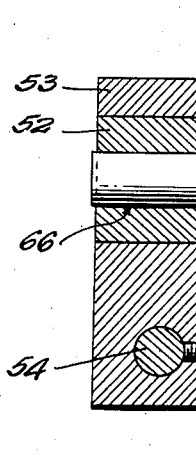
Figure 5:
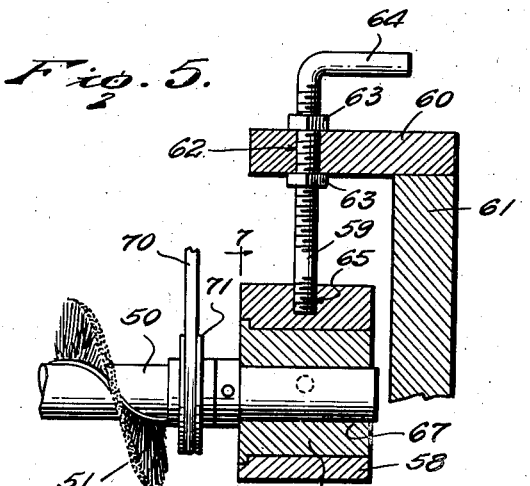

Figure 3 is a sectional view taken through the grader along the line 3—3 of Figure 2, Figure 4 is a fragmentary sectional view upon an enlarged scale taken along the line 4—4 of Figure 2, Figure 5 is a fragmentary sectional view upon an enlarged scale taken along the line 5—5 of Figure 2, Figure 6 is a sectional view taken along the line 6—6 of Figure 4, and Figure 7 is a view taken along the line 7—7 of Figure 5.

The frame or body 1 of this seed-cleaning and grading machine is of the same construction disclosed in the prior patent referred to above and has one wall formed with an opening through which extends an air inlet pipe 2 through which air enters the frame, a valve 3 of the butterfly type being mounted in this inlet pipe so that flow of air through the same may be controlled. A fan housing 4 is mounted in the body and formed with an air inlet 5 in one side and has its outlet spout 6 extending upwardly through the top wall of the body where it is connected with a fabric conduit 7. The shaft 8 of the fan 9 extends from the fan housing through a side wall of the body or frame 1 and carries a pulley 10 about which engages a belt 11. This belt also engages about a pulley 12 carried by the drive shaft 13 rotatably mounted in bearings 14 secured upon supporting bolsters 15 which are firmly secured to one end portion of the upper wall of the body and project therefrom, as shown in Figures 2 and 3. A second pulley 16 is secured upon the shaft 13 for engagement by a belt 17 which will be trained about a pulley carried by a motor or other suitable source of power. While it has been stated that the pulleys 12 and 16 are formed separate from each other and secured upon the shaft, it will be obvious that they may be made as a single double pulley.

The seed deck which is mounted above the frame or body 1 has a top or housing 18 defining an air chamber and having its bottom formed with an opening 18' into which fits the upper end of the fabric conduit 7. A collar or sleeve 19 rises from the bottom of the housing 18 about the opening in the bottom thereof and at its upper end this sleeve or neck carries a head 20 of wire mesh which serves to break up air passing through the mesh into a multiplicity of fine streams of air and thus cause the air to be well distributed in the housing. Reciprocating motion is to be imparted to the seed deck and in order to mount the deck and permit such motion there have been provided struts 21 having their upper ends connected with shafts 22 mounted in bearings 23 and their lower ends connected with shafts 24 mounted in bearings 25. A pitman 26 extends from the rear shaft 22 adjacent each side of the machine and rear ends of the pitman rods are eccentrically connected with a shaft 27, as shown at 28, so that, when the shaft 27 is rotating, reciprocating motion will be imparted to the two pitman rods and the seed deck reciprocated. The eccentric connections between the pitman shafts or rods 26 and the shaft 27 are of the same construction shown in the prior patent previously referred to. Pulleys 29 and 30 of the adjustable speed type are mounted upon the driving shaft 13 and the driven shaft 27 and about these pulleys engages a belt 31 so that rotary motion at controlled speed may be transmitted from the shaft 13 to the shaft 27.

Above the housing 18 is mounted a frame 32 supported upon upper edge faces of walls of the housing and between this frame and the housing is a sheet of wire fabric 33. Slats 34 extend transversely of the frame 32 in spaced relation to each other and these slats serve as supports for a sheet 35 of fine mesh woven wire screening. The sheets of wire 33 and 35 serve as distributors for air passing upwardly through the housing 18 and over the sheet of wire mesh 35 extend bars 36 which are formed of metal and are triangular in cross section. Referring to Figure 3, it will be seen that the perpendicularly extending side faces of the bars 36 face the front of the frame 32 of the deck and the sloping faces of the bars face rearwardly of the deck frame. Therefore, when seed is delivered from the hopper 37 through its discharge spout 38 onto the deck close to the rear end thereof, an oscillating movement is imparted to the deck and the seed will be gradually moved toward the forward end of the deck. As the seed move across the ribs or bars 36, the heavier seed will pass over the bars toward the side rail 39 of the guard frame 40, whereas the lighter seed will be caught between the bars or strips 36 and move toward the side rail 41 of the guard frame. The fact that strips or bars 36 are employed to separate the light seed from the heavy seed instead of a coarse wire screen as shown in the prior patent previously referred to prevents the seed from being caught in meshes of a sheet of coarse wire screen and, therefore, the seed separating deck will not become clogged. The heavy seed passes from the deck and moves across a platform 42 from which extend spouts 43 for delivering the seed to bags suspended from bag holders 44 and the light seeds pass across a platform 45 at the opposite side of the deck and through the spout 46 into sacks suspended from the sack holders 47. The platforms and their spouts and the sack holders are of the same construction shown in the prior patent and, therefore, the sack holders and the mechanism 48 for controlling flow of seed from the separating deck has not been specifically described. The seeds are not only separated into light and heavy seed as they move across the deck but the air passing upwardly from the housing through the slats and the wire mesh 35 carries off chaff and dust and, therefore, the grain will be thoroughly cleaned.

During movement of the seed across the deck, it is desired to have the seed agitated by a brushing movement rearwardly of the deck and thus insure proper grading of the seed along the deck and also permit air moving upwardly through the deck to act upon the seed in an efficient manner to remove all dust and chaff. In order to do so, there has been provided a brush 49 which is of the rotary type and consists of a shaft 50 and bristles 51 extending spirally about the shaft. The shaft extends longitudinally of the deck over the bars or ribs 36 and has one end mounted in a bearing 52 which is rotatably mounted in a block 53 near the upper end thereof. This block 53 is supported upon the longitudinal arcuate arm 54 of a bracket 55, and upon referring to Figure 2 it will be seen that, when the bracket is secured to the guard rail of the deck, the arm 54 extends transversely of the deck. Therefore, by sliding the block along the arcuate arm and securing it in an adjusted position by the set screw 56, the brush may be disposed in desired angular relation to the deck and firmly secured in a set position. The other end of the shaft is mounted in a bearing 57 rotatably received in the head or block 58 at the lower end of a stem 59. This stem extends through an opening formed in the upper flange 60 of the bridge or cross bar 61, and referring to Figure 5 it will be seen that the stem may turn freely in the opening 62 and is held against shifting vertically through this opening by upper and lower nuts 63. The upper end portion of the stem is turned to form a handle 64 by means of which the stem may be easily rotated and its threaded lower end screwed into or removed from the socket 65 formed in the block 58. By so mounting the block 58 the shaft 50 may have one end thrust into the opening of the bearing 52 carried by the block 53, its other end then engaged in the bearing 57 and the stem then screwed into the socket 65 to mount the brush longitudinally of the deck. The openings 66 and 67 of the blocks 52 and 57 are eccentric thereto, as clearly shown in Figures 6 and 7, so that by loosening the set screws 68 and 69 and turning the bearings the brush may be vertically adjusted and its bristles disposed in proper relation to upper edges of the bars or strips 36.

The brush is rotated during operation of the machine in a direction to impel the seed toward the rear end of the deck and thus prevent too deep a mass of seed from approaching the forward portion of the deck. In order to rotate the brush, there has been provided a belt 70 trained about a pulley 71 carried by the shaft of the brush and also trained about a pulley 72 carried by a shaft 73. The shaft 73 extends transversely of the bridge and is rotatably mounted in a bearing 74 carried by the flange 60 of the bridge or cross bar. At the opposite side of the bridge the shaft 73 carries another pulley 75 engaged by a belt 76 which extends toward the rear end of the bridge where it is engaged about a pulley 77 carried by a shaft 78 rotatably mounted in a bearing 79. The other end portion of the shaft 78 carries a pulley 80 above which is trained a belt 81 which extends downwardly below the deck and is engaged about a pulley 82 carried by a shaft 83 which is rotatably mounted in the arms of a bracket 84. This bracket 84 is secured upon the top wall of the frame 1 and carries a second pulley 85 about which engages a belt 86 which extends forwardly and is engaged with a pulley 87 carried by the shaft 27. It will thus be seen that rotary motion will be transmitted from the shaft 27 to the shaft of the brush.

When this device is in operation, seed is poured into the hopper 37 and flows through the discharge neck 38 thereof onto the deck at the rear end thereof. Reciprocating motion is imparted to the deck and during this movement the seed will be gradually shifted forwardly along the deck from the rear end of the deck toward the forward end thereof. During this movement of the seed the heavier seed will more readily pass over the sloping surfaces of the bars 36 and will pass from the deck onto the platform 42 while the lighter seed will move along the bars or ribs toward the forward end of the deck onto the platform 45. The air which is driven upwardly into the housing 18 of the deck passes up through the screens and the slats 34 and as it passes through meshes of the fine screen 35 between the bars or strips 36 dust and chaff will be carried upwardly by the air current and very effectively separated from the seed. By adjusting the belt 31 the speed at which the deck reciprocates and the speed at which the brush rotates may be controlled and by sliding the block 53 along the arm 54 of the bracket 55 the angular relation of the rotary brush to the strips or bars 36 can be regulated.

Having thus described the invention, what is claimed as new is:

1. In a seed cleaner and grader, a deck having a frame, a sheet of foraminous material in said frame, strips in said frame over said sheet spaced transversely from each other, a support carried by said frame and having an arcuate bar extending transversely of said strips, a mounting carried by said bar and adjustable longitudinally thereon, a bearing carried by said mounting, a second support spaced from the first support longitudinally of said strips, a mounting having a pivotal connection with the second support for turning adjustment about a vertical axis, a bearing carried by the second mounting, a rotary brush extending longitudinally of said strips and rotatably mounted in said bearings, the brush being eccentric to the bearings and the bearings being adapted to be turned in the mounting to adjust the brush relative to the strips, means for imparting rotary motion to said brush, and means for actuating said deck and causing movement of seed along the deck across said strips.

2. In a seed cleaner and separator, a deck having a frame, a foraminous sheet in said frame, strips mounted in said frame over said sheet, a bridge extending across said frame, a bearing supported from said bridge and mounted for pivotal adjustment, a bracket carried by said frame in spaced relation to said bridge longitudinally of said strips and having an arcuate arm constituting a segment of a circle having as its center the pivotal mounting of said bearing, a bearing carried by the arm of said bracket and adjustable longitudinally thereon, a rotary brush extending longitudinally of said strips and having its shaft journaled in said bearings, and means for imparting rotary motion to said brush.

3. In a seed cleaner and grader, a deck mounted for reciprocating movement, a bridge extending across said deck and having a laterally extending flange at its upper end, a stem disposed vertically through said flange and rotatably mounted, a mounting at the lower end of said stem, a bearing rotatably carried by said mounting, a bracket at the opposite end of said deck from said bridge, a mounting carried by said bracket and adjustable thereon longitudinally of said bridge in an arcuate path concentric to said stem, a bearing rotatably carried by the last-mentioned mounting, a brush extending between the bridge and bracket and rotatably mounted in said bearings eccentric thereto whereby upon turning said bearings, in the mountings the brush may be vertically adjusted, adjustment of the last-mentioned bearing along said bracket serving to horizontally adjust said brush, and means for transmitting rotary motion to said brush.

FRANK O. TAYLOR.